(12) United States Patent
Zhu (10) Patent No.: US 12,267,630 B1
(45) Date of Patent: Apr. 1, 2025

(54) RADAR MONITORING DASH CAM

(71) Applicant: Yunsong Zhu, Anhui (CN)

(72) Inventor: Yunsong Zhu, Anhui (CN)

( * ) Notice: Subject to any disclaimer, the term of this patent is extended or adjusted under 35 U.S.C. 154(b) by 0 days.

(21) Appl. No.: 18/885,589

(22) Filed: Sep. 14, 2024

(30) Foreign Application Priority Data

Jun. 21, 2024 (CN) .......................... 202421424701.3

(51) Int. Cl.
- *H04N 7/18* (2006.01)
- *G01S 13/86* (2006.01)
- *H04N 23/51* (2023.01)
- *H04N 23/57* (2023.01)

(52) U.S. Cl.
CPC ........... *H04N 7/188* (2013.01); *G01S 13/867* (2013.01); *H04N 7/181* (2013.01); *H04N 23/51* (2023.01); *H04N 23/57* (2023.01)

(58) Field of Classification Search
CPC ........ H04N 7/188; H04N 23/51; H04N 23/57; H04N 7/181; G01S 13/867
USPC ........................................................ 348/148
See application file for complete search history.

(56) References Cited

U.S. PATENT DOCUMENTS

| | | | | |
|---|---|---|---|---|
| 5,034,747 A * | 7/1991 | Donahue | .............. | A42B 3/0433 455/344 |
| 9,229,104 B2 * | 1/2016 | Klar | ...................... | G01S 13/931 |
| 9,635,319 B1 * | 4/2017 | Englander | ................ | H04N 5/77 |
| 2016/0142596 A1 * | 5/2016 | DePaschoal | ........... | H04N 23/63 348/38 |
| 2020/0073212 A1 * | 3/2020 | Bin | ........................ | H02K 1/187 |
| 2021/0033950 A1 * | 2/2021 | Thomas | ............. | F16M 11/2028 |
| 2022/0038632 A1 * | 2/2022 | Peng | .................... | G05D 1/0094 |
| 2022/0221574 A1 * | 7/2022 | Chung | .................... | G01S 7/027 |
| 2022/0413306 A1 * | 12/2022 | Ahuja | .................. | G02B 27/017 |
| 2023/0196620 A1 * | 6/2023 | Zhang | ................ | G01B 11/2755 348/135 |
| 2023/0247271 A1 * | 8/2023 | Mirchef | ................. | H04N 23/54 348/148 |
| 2023/0353861 A1 * | 11/2023 | Nordquist | ............ | H04N 23/695 |
| 2024/0184186 A1 * | 6/2024 | Thomson | ............... | G01C 21/18 |

\* cited by examiner

*Primary Examiner* — Matthew David Kim (74) *Attorney, Agent, or Firm* — Daniel M. Cohn (57) ABSTRACT

A radar monitoring dash cam includes a shell assembly, a camera assembly, a control assembly and a radar assembly. The shell assembly includes a first outer shell with a first accommodating chamber. The camera assembly includes a first camera module. The first camera module is arranged in the first outer shell. The control assembly includes a first circuit board arranged in the first accommodating chamber. The first circuit board is electrically connected to the first camera module. The radar assembly includes a radar module. The radar module is electrically connected to the first circuit board. The camera assembly is configured to be turned on when the radar module detects that a moving object or a person approaches a preset distance.

17 Claims, 11 Drawing Sheets

RADAR MONITORING DASH CAM

TECHNICAL FIELD

The present disclosure relates to the technical field of dash cams, and in particular, to a radar monitoring dash cam.

BACKGROUND

A dash cam is an instrument configured to record relevant information such as images and sounds during driving of a vehicle. The dash cam can not only record video images and sounds in a driving process of the vehicle to assist in driving, but also can be used as a parking monitor to record information around the vehicle after the vehicle engines off, thereby improving the safety of properties of the vehicle after the vehicle is parked, reducing damage to the vehicle and other properties, and reducing subsequent pursuing of recovery.

The existing dash cam consumes the power of a storage battery of the vehicle after the vehicle engines off. After a parking monitoring function is activated, a front camera on the dash cam is used to monitor an area in front of the vehicle, and parking monitoring is achieved by using 24-hour uninterrupted recording. As a result, many audio and video files are generated, which occupy a large storage space.

To reduce the data storage load of the dash cam, early data will be automatically deleted at a regular interval to ensure that the dash cam always has the storage capacity, but can only store data recorded in the latest stage. No matter if there is an accident occurring, the dash cam will make a record indiscriminately and replace early potentially useful data. Data that exceeds the storage time limit cannot be queried by a user. For example, an ordinary dash cam only retains data recorded within the last two weeks, and data recorded longer than two weeks will be automatically cleared by a system and cannot be queried.

SUMMARY

Embodiments of the present disclosure provide a radar monitoring dash cam, including:
  a shell assembly, including a first outer shell with a first accommodating chamber;
  a camera assembly, including a first camera module, wherein the first camera module is arranged in the first outer shell;
  a control assembly, including a first circuit board arranged in the first accommodating chamber, and the first circuit board is electrically connected to the first camera module; and
  a radar assembly, including a radar module, wherein the radar module is electrically connected to the first circuit board; and the camera assembly is configured to be turned on when the radar module detects that a moving object or a person approaches a preset distance.

In an embodiment, the radar module is arranged in the first accommodating chamber.

In an embodiment, the first outer shell includes a front shell and a rear shell; the front shell and the rear shell are connected and are enclosed to form the first accommodating chamber; a mounting port is provided on the rear shell; and the first camera module is arranged in the mounting port in a penetrating manner.

In an embodiment, the radar assembly includes a second circuit board; the radar module is arranged on the second circuit board; and the second circuit board is arranged in the first accommodating chamber and is electrically connected to the first circuit board.

In an embodiment, the radar assembly further includes a control switch configured to control the radar module; the control switch is electrically connected to the second circuit board; the control switch is arranged on the first outer shell; the first outer shell is provided with a first opening communicated to the first accommodating chamber; and the control switch is arranged in the first opening in a penetrating manner and is exposed out of the first outer shell.

In an embodiment, the radar assembly further includes an indicator lamp; the indicator lamp is electrically connected to the second circuit board; the indicator lamp is configured to be turned on when the radar module works; the indicator lamp is arranged on the first outer shell; the first outer shell is provided with a second opening communicated to the first accommodating chamber; and the indicator lamp is arranged in the second opening in a penetrating manner and is exposed out of the first outer shell.

In an embodiment, the control assembly further includes a display screen; the display screen is arranged on the first outer shell; and the display screen is electrically connected to the first circuit board.

In an embodiment, the camera assembly further includes a second camera module; the second camera module is electrically connected to the first circuit board; and the second camera module is configured to be rotatably connected to the first outer shell.

In an embodiment, the first outer shell is provided with a third opening; the camera assembly further includes a supporting frame; the supporting frame is provided with a first rotating shaft; the first rotating shaft is arranged in the third opening in a penetrating manner; the second camera module is connected to the supporting frame; and the supporting frame is configured to drive the second camera module to rotate around the first rotating shaft.

In an embodiment, the supporting frame further includes a supporting frame body and a first limiting member; the first limiting member and the supporting frame body are respectively arranged at two ends of the first rotating shaft; when the first rotating shaft is arranged in the third opening in the penetrating manner, the first limiting member is located in the first accommodating chamber; and a diameter of the first limiting member is greater than a diameter of the third opening.

In an embodiment, the supporting frame further includes a first silica gel ring; and the first silica gel ring sleeves the first rotating shaft and resists against a hole wall of the third opening.

In an embodiment, the second camera module includes a shell and a camera arranged on the shell; the shell is provided with a second rotating shaft; the supporting frame is provided with a fourth opening; the second rotating shaft is arranged in the fourth opening in a penetrating manner; and the shell is configured to drive the camera to rotate around the second rotating shaft.

In an embodiment, the second camera module further includes a second limiting member; the second limiting member and the shell are respectively arranged at two ends of the second rotating shaft; the supporting frame body includes a side plate; the fourth opening penetrates through the side plate; when the second rotating shaft is arranged in the fourth opening in the penetrating manner, the second limiting member is located on one side of the side plate away from the shell; and a diameter of the second limiting member is greater than a diameter of the fourth opening.

In an embodiment, the second camera module further includes a second silica gel ring; and the second silica gel ring sleeves the second rotating shaft and resists against a hole wall of the fourth opening.

In an embodiment, the shell is provided with a second accommodating chamber and a mounting port communicated to the second accommodating chamber; the camera arranged in the mounting port in a penetrating manner; the second camera module further includes a third circuit board arranged in the second accommodating chamber; and the third circuit board is electrically connected to the camera and the first circuit board.

In an embodiment, the camera assembly further includes a partition plate; the partition plate is arranged between the first outer shell and the supporting frame; the partition plate is connected to the supporting frame; a via hole is provided on the partition plate; and the first rotating shaft passes through the via hole and the third opening.

In an embodiment, two second camera modules are included; the two second camera modules are respectively arranged at two ends of the first outer shell; and the second camera modules are configured to be rotatably connected to the first outer shell.

In an embodiment, the radar assembly is configured to be detachably connected to the shell assembly; and the radar module is configured to be detachably electrically connected to the first circuit board.

In an embodiment, the radar assembly further includes a second outer shell with a third accommodating chamber, and a second circuit board arranged in the third accommodating chamber; the radar module is arranged on the second circuit board; the first outer shell is provided with a third opening communicated with the first accommodating chamber; the second outer shell is provided with a connecting hole communicated to the third accommodating chamber; the first circuit board is provided with a first electrical connecting piece; the second circuit board is provided with a second electrical connecting piece; the second electrical connecting piece is electrically connected to the first electrical connecting piece through the connecting hole and the third opening; and the first electrical connecting piece and the second electrical connecting piece are configured as detachable electrical connection structures.

In an embodiment, the radar assembly further includes a fixed frame; the fixed frame is arranged in the connecting hole and is connected to the second outer shell; the fixed frame is provided with a through hole; the first electrical connecting piece is electrically connected to the second electrical connecting piece through the through hole; the fixed frame is provided with a first buckle; the first outer shell is provided with a second buckle; and the first buckle is buckled with the first buckle.

Compared with the prior art, the radar monitoring dash cam provided by the present disclosure has the advantages that after a vehicle engines off, the dash cam can be in a dormant or off state. The radar module is activated and monitors an environment around the vehicle. When a moving object or a person or an animal is detected, the camera assembly is controlled to be turned on to start to take a video of the surrounding environment of the vehicle. Later, after the pedestrian or animal or moving object gets away from the vehicle, the camera module continues to be dormant and standby or turned off, and the radar module continues to keep a monitoring state, thereby reducing the power consumption of the dash cam, reducing the consumption of the power of a storage battery of the vehicle, and prolonging the life of the storage battery. Meanwhile, by the arrangement of a plurality of camera modules, the surrounding environment of the vehicle can be monitored in multiple directions, thereby achieving more comprehensive protection. Moreover, the sensitivity of the radar module can be adjusted, so that a monitoring range can be set and adjusted according to the vehicle and the surrounding environment. The indicator lamp reminds pedestrians approaching the vehicle, thereby achieving an effect of protecting the safety of the vehicle and properties.

BRIEF DESCRIPTION OF THE DRAWINGS

In order to explain the technical solutions of the embodiments of the present disclosure more clearly, the following will briefly introduce the accompanying drawings used in the embodiments. Apparently, the drawings in the following description are only some embodiments of the present disclosure. Those of ordinary skill in the art can obtain other drawings based on these drawings without creative work.

DETAILED DESCRIPTION OF THE EMBODIMENTS

In order to facilitate understanding the present disclosure, the present disclosure will be described more comprehensively below with reference to related accompanying drawings. Preferred implementations of the present disclosure are provided in the drawings. However, the present disclosure can be implemented in many different forms, and are not limited to the implementations described herein. On the contrary, these implementations are provided to make the content disclosed in the present disclosure understood more thoroughly and comprehensively.

It should be noted that when an element is referred to as being "fixed to" another element, the element can be directly on another component or there can be a centered element. When an element is considered to be "connected" to another element, the element can be directly connected to another element or there may be a centered element. The terms "inner", "outer", "left", "right", and similar expressions used herein are for illustrative purposes only and do not necessarily represent the only implementation.

Unless otherwise defined, all technical and scientific terms used herein have the same meaning as those commonly understood by a person skilled in the art to which the present disclosure belongs. Terms used in the specification of the present disclosure herein are merely intended to describe objectives of the specific embodiments, but are not intended to limit the present disclosure. The term "and/or" used herein includes any and all combinations of one or more related listed items.

Embodiment I

Figure 1:
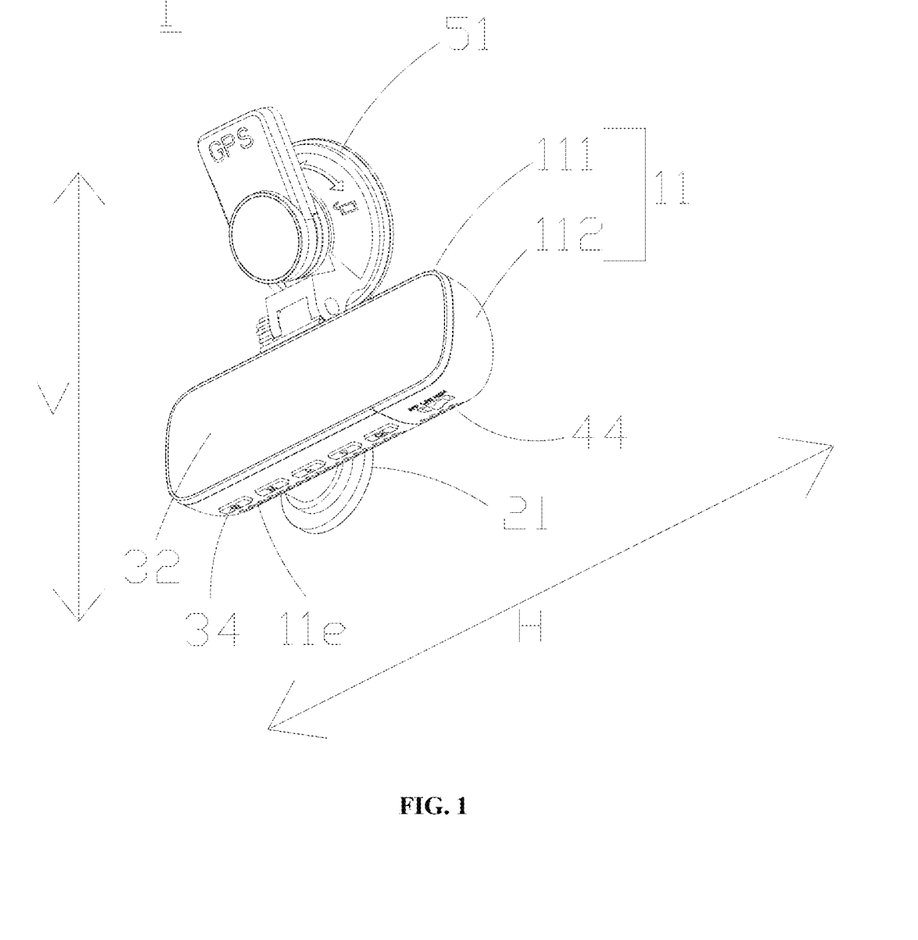
FIG. 1 is a three-dimensional diagram of a radar monitoring dash cam according to Embodiment I of the present disclosure.
Figure 2:
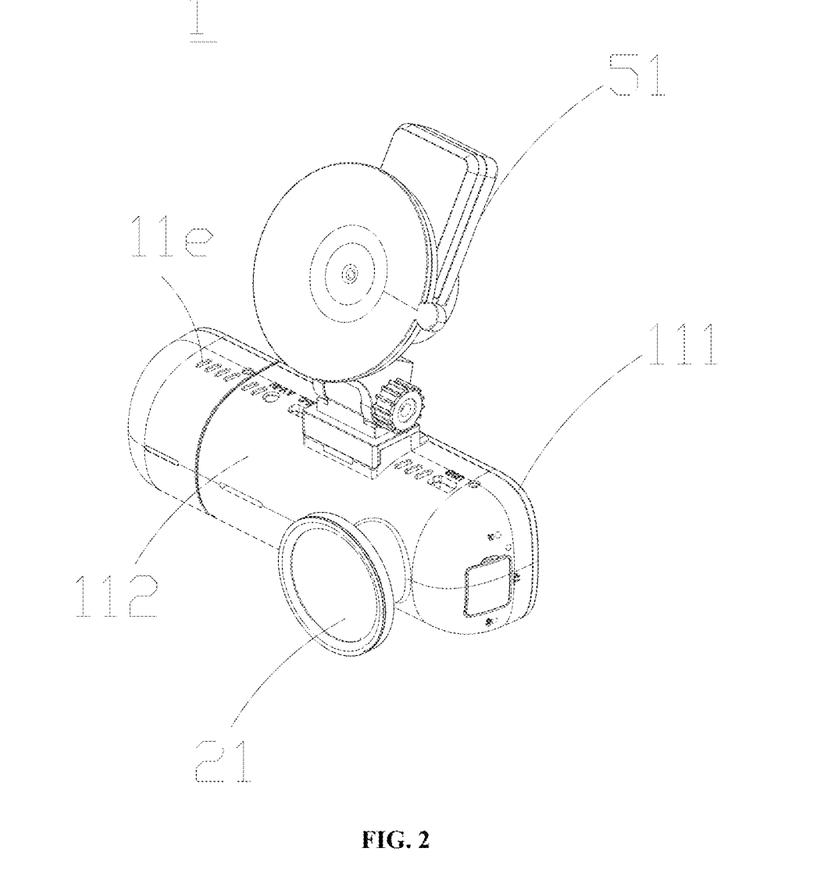
FIG. 2 is a three-dimensional diagram of a radar monitoring dash cam according to Embodiment I of the present disclosure in another angle.

Referring to FIG. 1 and FIG. 2, Embodiment I of the present disclosure provides a radar monitoring dash cam 1 arranged on a vehicle. The radar monitoring dash cam is configured to record driving and assist in driving, and may be further configured to monitor a surrounding environment of the vehicle after the vehicle engines off and is parked, to deter persons who vandalize the vehicle or properties inside the vehicle, thereby reducing vehicle and property losses.

Figure 3:
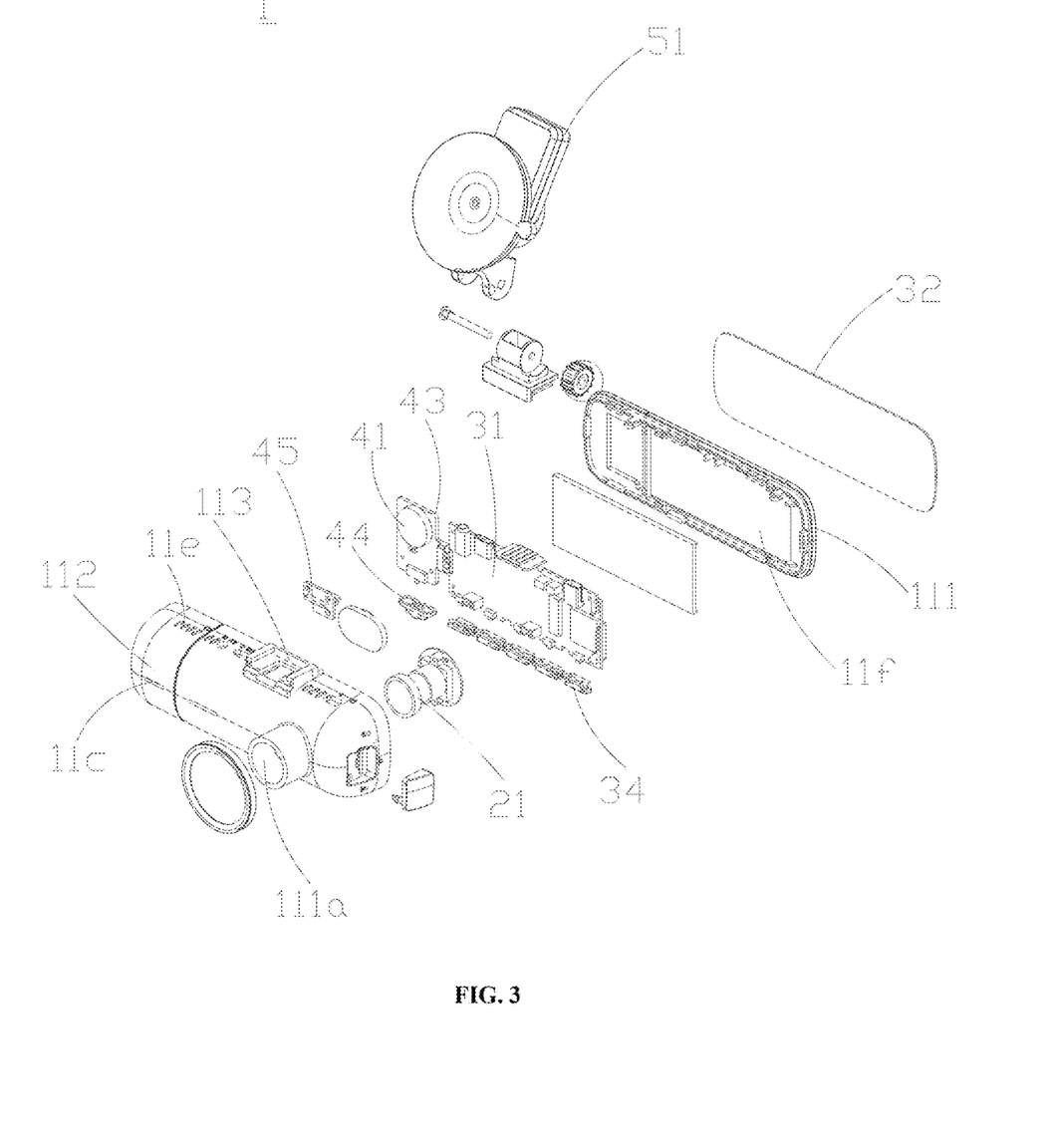
FIG. 3 is an exploded diagram of a radar monitoring dash cam according to Embodiment I of the present disclosure.
Figure 4:
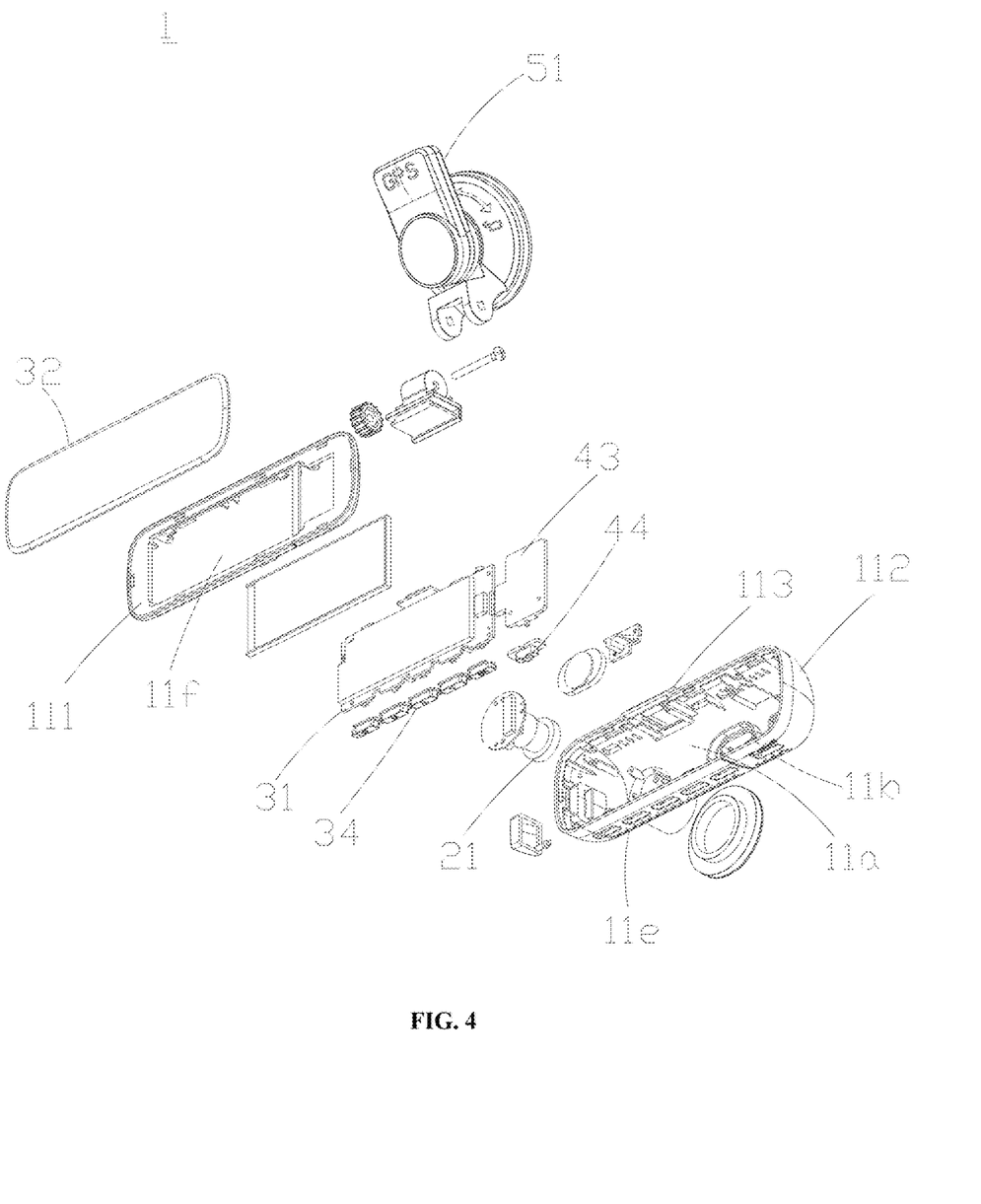
FIG. 4 is an exploded diagram of a radar monitoring dash cam according to Embodiment I of the present disclosure in another angle.

Referring to FIG. 3 and FIG. 4, the radar monitoring dash cam 1 provided in Embodiment I of the present disclosure includes a shell assembly, a camera assembly, a control assembly, and a radar assembly. The shell assembly includes a first outer shell 11 with a first accommodating chamber 11a. The camera assembly includes a first camera module 21. The first camera module 21 is arranged on the first outer shell 11. The control assembly includes a first circuit board 31 arranged in the first accommodating chamber 11a. The first circuit board 31 is electrically connected to the first camera module 21. The radar assembly includes a radar module 41. The radar module 41 is electrically connected to the first circuit board 31. The camera assembly is configured to be turned on when the radar module 41 detects that a moving object or a person approaches a preset distance.

Specifically, the preset distance is set according to a size of the vehicle. It can be a circular monitoring range, a circle center of which is a position where the radar module 41 is located and a diameter of which is 3 meters or 5 meters or another preset numerical value. Or, it may be an elliptical monitoring range that covers an entire vehicle body. The specific preset distance is set according to the size of the vehicle, which can fully cover the entire vehicle body, so that the camera assembly is turned on to take a video after the moving object, person, or animal is detected, thereby reducing the power consumption of the radar monitoring dash cam 1.

Compared with the prior art, the radar monitoring dash cam 1 provided by the present disclosure has the advantages that after a vehicle engines off, the dash cam can be in a dormant or off state. The radar module 41 is activated and monitors an environment around the vehicle. When a moving object or a person or an animal is detected, the camera assembly is controlled to be turned on to start to take a video of the surrounding environment of the vehicle. Later, after the pedestrian or animal or moving object gets away from the vehicle, the camera module continues to be dormant and standby or turned off, and the radar module 41 continues to keep a monitoring state, thereby reducing the power consumption of the dash cam, reducing the consumption of the power of a storage battery of the vehicle, and prolonging the life of the battery.

The radar module 41 in the present disclosure is a millimeter-wave radar sensor with a specific frequency of 5.8 GHz. The millimeter-wave radar has a small size, is easily integrated, and has a high spatial resolution, higher ability to penetrate fog, smoke, and dust, and high anti-interference ability. The working principle of the radar module 41 is to: emit electromagnetic waves, receive reflected signals, analyze time differences and frequency changes of these signals to calculate distances and speeds of targets, and achieve ranging and speed measurement of a plurality of targets. In the present disclosure, the millimeter-wave radar is used to monitor the surrounding environment after the vehicle engines off and is parked, so as to comprehensively monitor a plurality of objects or persons or animals moving towards the vehicle in all directions, and trigger the camera module to be turned on to take a video, thereby reducing the power consumption of the dash cam.

In this embodiment, the first outer shell 11 includes a front shell 111 and a rear shell 112; the front shell 111 and the rear shell 112 are connected and are enclosed to form the first accommodating chamber 11a; a mounting port 111a is provided on the rear shell 112; and the first camera module 21 is arranged in the mounting port 111a in a penetrating manner. The front shell 111 and the rear shell 112 can be connected through a buckle or a screw, or in a manner such as gluing or hot sealing. By the arrangement of the front shell 111 and the rear shell 112, it is convenient for production and assembling.

Further, the radar module 41 is arranged in the first accommodating chamber 11a. Specifically, the radar assembly includes a second circuit board 43; the radar module 41 is arranged on the second circuit board 43; and the second circuit board 43 is arranged in the first accommodating chamber 11a and is electrically connected to the first circuit board 31. In this embodiment, the second circuit board 43 is arranged at one end of the first circuit board 31, specifically on a right side of the first circuit board 31 in a horizontal direction H. Of course, in other embodiments, the specific position of the second circuit board 43 may alternatively be on a left side of the first circuit board 31 in the horizontal direction H, or above and below the first circuit board 31 in a vertical direction V. The present disclosure does not make a specific limitation, as long as the second circuit board is within the first accommodating chamber 11a. By the arrangement of the second circuit board 43, the radar module 41 can be better controlled, thereby improving the performance of the radar module. Of course, in other embodiments, the radar module 41 can be directly arranged on the first circuit board 31.

To facilitate controlling the radar module 41 to be turned on and turned off, the radar assembly further includes a control switch 44 configured to control the radar module 41; the control switch 44 is electrically connected to the second circuit board 43; and the control switch 44 is arranged in the first outer shell 11. Specifically, a first opening lib that is communicated with the first accommodating chamber 11a is provided at a bottom of the rear shell 112, and the control switch 44 is arranged in the first opening 11b in a penetrating manner and is exposed out of the first outer shell 11, making it convenient for a user to perform control or toggling.

In this example, the radar module 41 can also be divided into two frequency bands: high sensitivity and low sensitivity. In this embodiment, the high-sensitivity frequency band and the low-sensitivity frequency band are adjusted by the control switch 44. Different monitoring ranges are set by using an algorithm program set on the circuit board, thereby differentiating the monitoring ranges to adapt to different application scenarios.

Further, the radar assembly further includes an indicator lamp 45; the indicator lamp 45 is electrically connected to the first circuit board 43; and the indicator lamp 45 is configured to be turned on when the radar module 41 works. When the radar module 41 is turned off, the indicator lamp 45 is in an off state. When the radar module 41 is turned on, the indicator lamp 45 is in an on state, namely, it emits light. The indicator lamp 45 is arranged on the first outer shell 11. Specifically, the indicator lamp 45 is arranged on the rear shell 112. The rear shell 112 is provided with a second opening 11c that is communicated with the first accommodating chamber 11a. The indicator lamp 45 is arranged in the second opening 11c in a penetrating manner and is exposed out of the first outer shell 11, making it convenient for a pedestrian outside the vehicle to observe the indicator lamp 45, thereby reducing the probability that the pedestrian intends to vandalize the vehicle or properties inside the vehicle. The sensitivity of the radar module 41 can be adjusted, so that a monitoring range can be set and adjusted according to the vehicle and the surrounding environment. The indicator lamp 45 reminds pedestrians approaching the vehicle, thereby achieving an effect of protecting the safety of the vehicle and properties.

To facilitate a user to adjust and watch video content taken by the dash cam, the control assembly further includes a display screen 32. The display screen 32 is arranged on the first outer shell 11. Specifically, the display screen 32 is arranged on the front shell 111. The front shell 111 is provided with a mounting window 11f for mounting the display screen 32. The display screen 32 is electrically connected to the first circuit board 31. In this embodiment, the display screen 32 is an ordinary light-emitting diode (LED) or liquid crystal display (LCD) screen.

In this embodiment, the rear shell 112 is further provided with heat dissipation holes 11e. The heat dissipation holes 11e are arranged at a top and bottom of the rear shell 112. Since the heat dissipation holes 11e are arranged at the top and bottom of the rear shell 112, so that heat inside the radar monitoring dash cam 1 can be circulated through the corresponding heat dissipation holes 11e, thereby quickly dissipating the heat to the outside.

A button 34 is further arranged on the radar monitoring dash cam 1 and is configured to control the radar monitoring dash cam 1. The button 34 is electrically connected to the first circuit board 31. Specifically, the first outer shell 11 is further provided with an opening configured to mount the button 34. There is one or two or more buttons 34, and the number of the openings corresponds to the number of the buttons 34. When there are two or more buttons 34, one button 34 is configured to control the dash cam to be turned on and turned off. One button 34 is configured to enter a menu system of the dash cam, which allows a user to access and adjust settings, such as the recording quality, cyclic recording, the time stamp, the volume, and the personalized configuration, or to switch different recording modes, such as switching from a normal recording mode to a motion detection mode. The other two buttons 34 are configured for up-down selection in the menu system. The last button 34 is configured for confirmation selection.

In other embodiments, the display screen 32 may further use a touch display screen 32, so that the radar monitoring dash cam 1 only needs to be touched, without setting physical buttons 34 to control the radar monitoring dash cam 1.

In this embodiment, the radar monitoring dash cam 1 is further provided with a USB port, a Type-c port, an audio and video input port, a speaker, a working lamp, a memory card, a reset key, and the like which are electrically connected to the first circuit board 31. The speaker is configured to play audios; the working lamp is configured to indicate a working state of the dash cam and a radar; and the memory card is configured to store video files of the camera module.

When the radar module 41 detects that a moving object, a pedestrian, or an animal approaches the vehicle, the first circuit board 31 can control the speaker to send a preset audio file to: remind the pedestrian that there is a dash cam in the vehicle taking pictures and please do not approach the vehicle, or to send other sounds to remind the approaching pedestrian, moving object, or animal.

In this embodiment, the radar monitoring dash cam 1 further includes a connecting piece 51; a connecting seat 113 is further arranged on the first outer shell 11; the connecting piece 51 is connected to the connecting seat 113 and the vehicle to mount the radar monitoring dash cam 1 on the vehicle. The connecting seat 113 is a clamping slot, and the connecting piece 51 is provided with a clamping block. The clamping block is clamped with the clamping slot to achieve detachable connection. The connecting piece 51 can be sucked to the vehicle by a suction cup or can be adhered on the vehicle by an adhesive. Of course, in other embodiments, the connecting piece 51 can also be connected to the first outer shell 11 through a screw or fixedly.

Embodiment II

Figure 5:
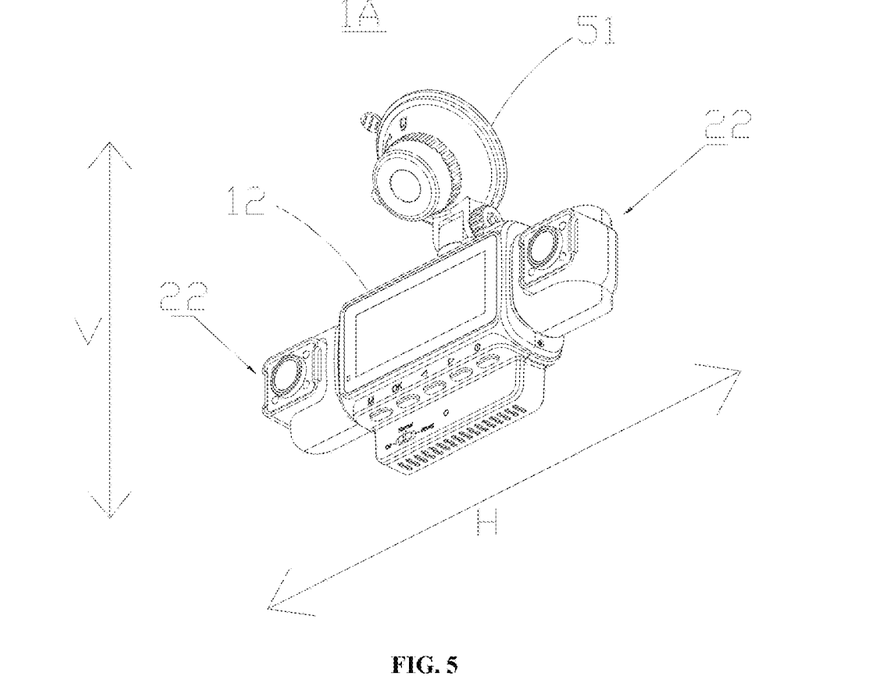
FIG. 5 is a three-dimensional diagram of a radar monitoring dash cam according to Embodiment II of the present disclosure.
Figure 6:
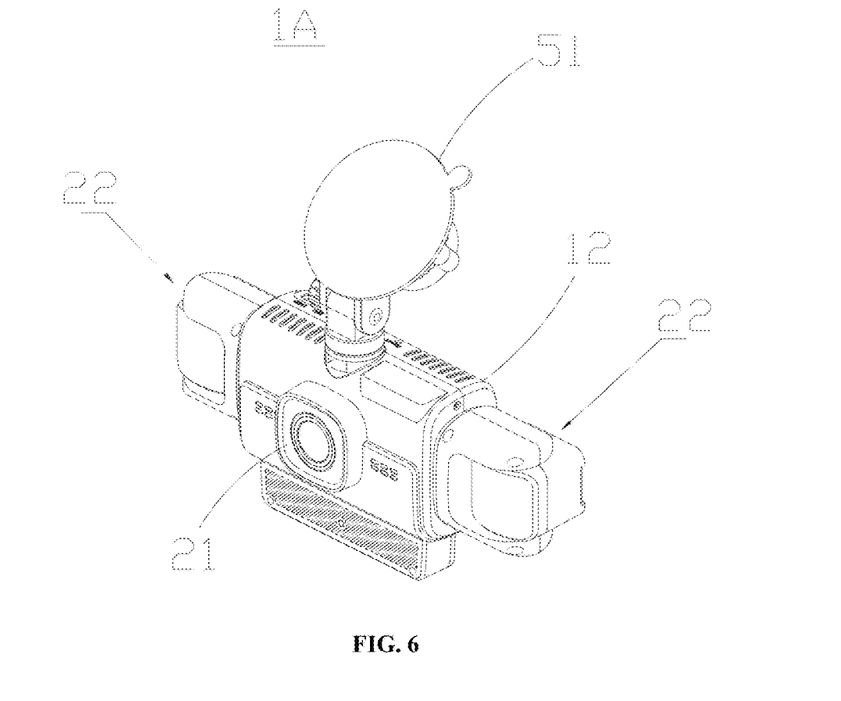
FIG. 6 is a three-dimensional diagram of a radar monitoring dash cam according to Embodiment II of the present disclosure in another angle.

Referring to FIG. 5 and FIG. 6, a radar monitoring dash cam 1A according to Embodiment II of the present disclosure is shown. Some structures of the radar monitoring dash cam 1A are the same as those of the radar monitoring dash cam 1 provided in Embodiment I. The same structures will not be elaborated in Embodiment II. The following only describes the different technical solutions of the two embodiments. Meanwhile, the same structural components in the two embodiments will continue to be labeled with the same numerals, and different or distinct structural components will be labeled with different numerals.

In Embodiment II, the setting mode of the radar assembly is the same as that in Embodiment I. The radar module 41 is arranged on the second circuit board 43 and in the first accommodating chamber 12a.

Figure 7:
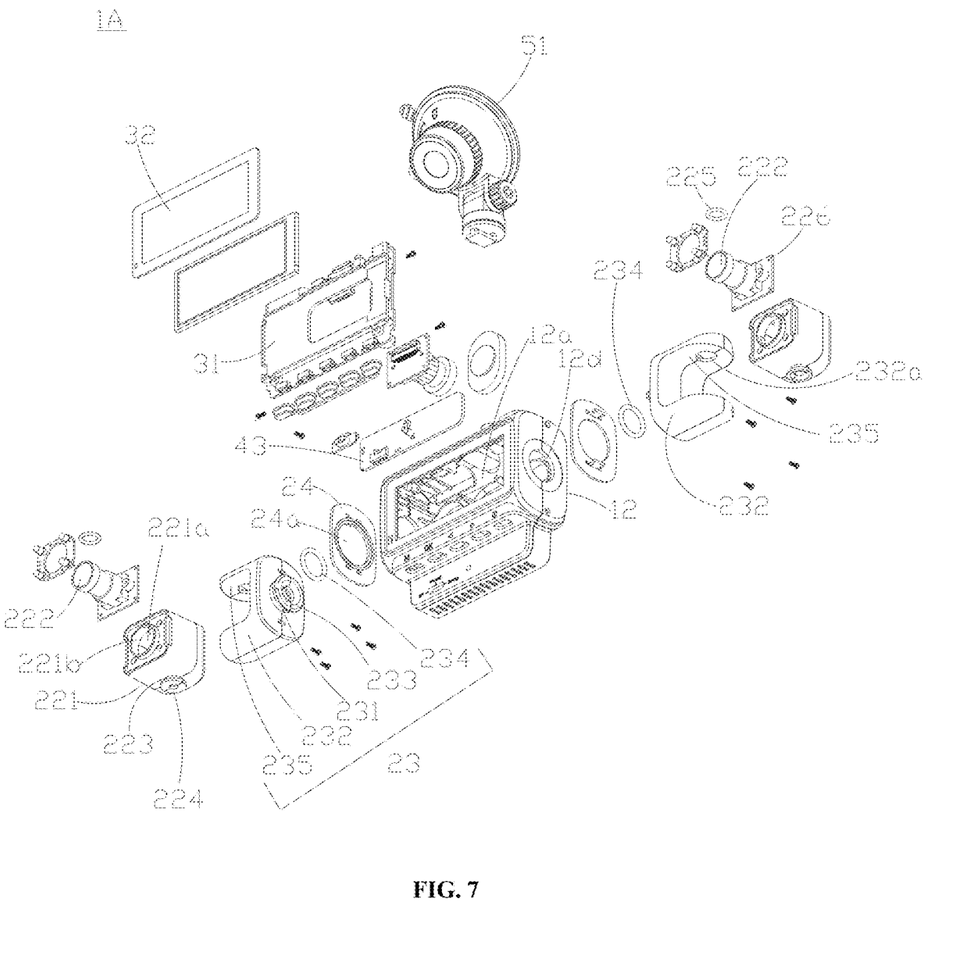
FIG. 7 is an exploded diagram of a radar monitoring dash cam according to Embodiment II of the present disclosure.
Figure 8:
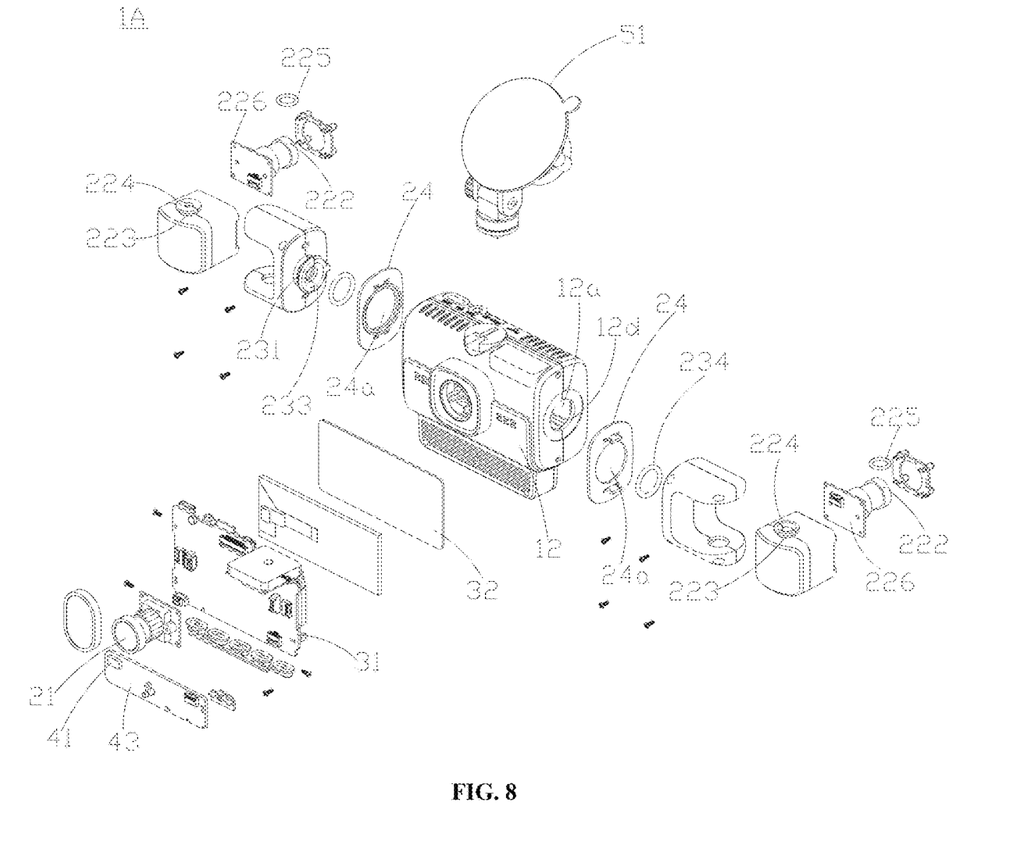
FIG. 8 is an exploded diagram of a radar monitoring dash cam according to Embodiment II of the present disclosure in another angle.

Referring to FIG. 7 and FIG. 8, in this embodiment, the camera assembly further includes a second camera module 22; the second camera module 22 is electrically connected to the first circuit board 31; and the second camera module 22 is configured to be rotatably connected to the first outer shell 12.

Further, the first outer shell 12 is provided with a third opening 12d; the camera assembly further includes a supporting frame 23; the supporting frame 23 is provided with a first rotating shaft 231; the first rotating shaft 231 is arranged in the third opening 12d in a penetrating manner;

the second camera module 22 is connected to the supporting frame 23; and the supporting frame 23 is configured to drive the second camera module 22 to rotate around the first rotating shaft 231. Specifically, in this embodiment, a lengthwise direction of the first outer shell 12 is taken as a horizontal direction H, and a height direction of the first outer shell 12 is taken as a vertical direction V. The vertical direction V is perpendicular to the horizontal direction H. The first rotating shaft 231 is located on a horizontal axis of the supporting frame 23. The supporting frame 23 can rotate around the first rotating shaft 231, thereby driving the second camera module 22 to rotate in the vertical direction V, which achieves a 360-degree circumferential rotation of the second camera module 22, thereby expanding the image capture range of the second camera module 22.

Specifically, to prevent the supporting frame 23 from being separated from the first outer shell 12 during rotation, the supporting frame 23 further includes a supporting frame body 232 and a first limiting member 233; the first limiting member 233 and the supporting frame body 232 are respectively arranged at two ends of the first rotating shaft 231; when the first rotating shaft 231 is arranged in the third opening 12d in the penetrating manner, the first limiting member 233 is located in the first accommodating chamber 12a; and a diameter of the first limiting member 233 is greater than a diameter of the third opening 12d. In this embodiment, the first limiting member 233 and the third opening 12d are both designed to be circular. In other embodiments, the first limiting member 233 and the third opening 12d can also have other structural shapes, as long as it can ensure that the first limiting member 233 cannot be separated from the third opening 12d and ensure that the first rotating shaft 231 rotates in the third opening 12d.

Further, the supporting frame 23 further includes a first silica gel ring 234; and the first silica gel ring 234 sleeves the first rotating shaft 231 and resists against a hole wall of the third opening 12d. By the arrangement of the first silica gel ring 234, the friction force between the supporting frame 23 and the first outer shell 12 is increased, thereby achieving a stable rotation angle of the supporting frame 23 after rotation, and achieving stable image capture.

Figure 9:
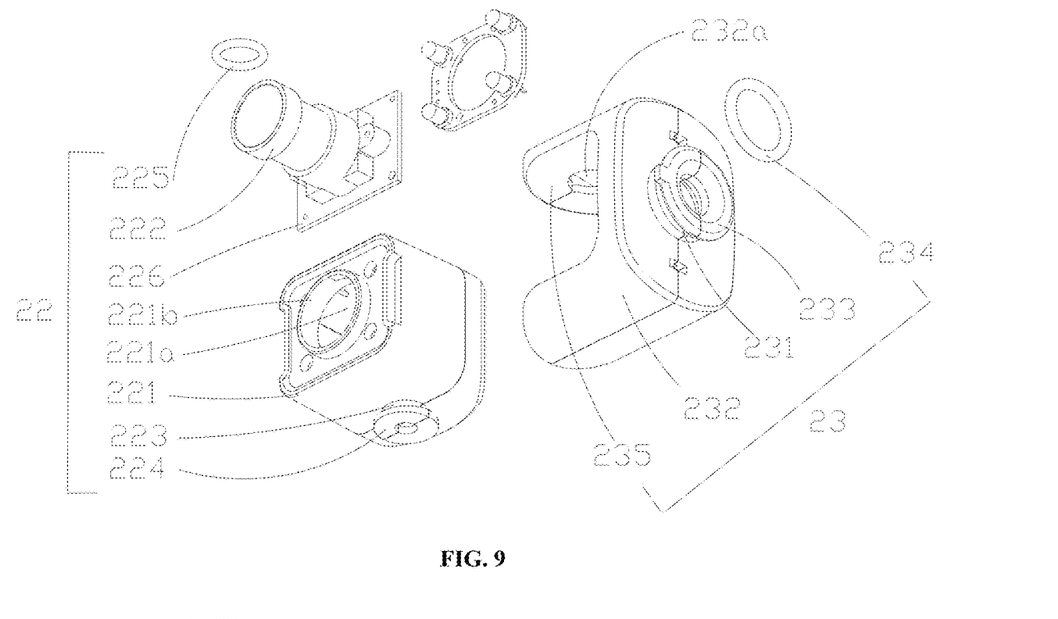
FIG. 9 is an exploded diagram of a second camera module of the radar monitoring dash cam shown in FIG. 5.

Referring to FIG. 9, in this embodiment, the second camera module 22 includes a shell 221 and a camera 222 arranged on the shell 221; the shell 221 is provided with a second rotating shaft 223; the supporting frame 23 is provided with a fourth opening 232a; the second rotating shaft 223 is arranged in the fourth opening 232a in a penetrating manner; and the shell 221 is configured to drive the camera 222 to rotate around the second rotating shaft 223. The second rotating shaft 223 is arranged on the shell 221 in the vertical direction V and is connected to the supporting frame 23, so that the shell 221 can drive the camera 222 to rotate in the horizontal direction H, thereby enabling the camera 222 to rotate an angle in the horizontal direction H to expand the image capture range.

Further, the second camera module 22 further includes a second limiting member 224. The second limiting member 224 and the shell 221 are respectively arranged at two ends of the second rotating shaft 223. The supporting frame body 232 includes a side plate 235; the fourth opening 232a penetrates through the side plate 235; when the second rotating shaft 223 is arranged in the fourth opening 232a in the penetrating manner, the second limiting member 224 is located on one side of the side plate 235 away from the shell 221; and a diameter of the second limiting member 224 is greater than a diameter of the fourth opening 232a. In this embodiment, the second limiting member 224 and the fourth opening 232a are both designed to be of circular structures. In other embodiments, the second limiting member 224 and the fourth opening 232a can also have other structural shapes, as long as it can ensure that the second limiting member 224 cannot be separated from the fourth opening 232a and ensure that the second rotating shaft 223 rotates in the fourth opening 232a.

The second camera module 22 further includes a second silica gel ring 225; and the second silica gel ring 225 sleeves the second rotating shaft 223 and resists against a hole wall of the fourth opening 232a. By the arrangement of the second silica gel ring 225, the friction force between the supporting frame 23 and the second camera module 22 is increased, thereby achieving a stable rotation angle of the second camera module 22 after rotation, and achieving stable image capture.

Specifically, the shell 221 is provided with a second accommodating chamber 221a and a mounting port 221b communicated to the second accommodating chamber 221a, and the camera 222 is arranged in the mounting port 221b in a penetrating manner. The second camera module 22 further includes a third circuit board 226 arranged in the second accommodating chamber 221a; and the third circuit board 226 is electrically connected to the camera 222 and the first circuit board 31. By the arrangement of the third circuit board 226, it is convenient to better control the camera 222. In other embodiments, the camera 222 can also be directly electrically connected to the first circuit board 31.

Continuing to refer to FIG. 7 and FIG. 8, in this embodiment, the camera assembly further includes a partition plate 24; the partition plate 24 is arranged between the first outer shell 12 and the supporting frame 23; the partition plate 24 is connected to the supporting frame 23; a via hole 24a is provided on the partition plate 24; and the first rotating shaft 231 passes through the via hole 24a and the third opening 12d. By the arrangement of the partition plate 24, wear of the first outer shell 12 or the supporting frame 23 during the rotation of the supporting frame 23 can be avoided, thereby prolonging the service life of the product.

In this embodiment, two second camera modules 22 are included. The two second camera modules 22 are respectively arranged at two ends of the first outer shell 12; and the second camera modules 22 are configured to be rotatably connected to the first outer shell 12. The two second camera modules 22 are separately arranged at two ends of the first outer shell 12 in the horizontal direction H of the first outer shell 12, which can capture images of the first outer shell 12 in two opposite directions. In other embodiments, one second camera module 22 may be included, which is arranged on one side of the first outer shell 12 in the horizontal direction H. Meanwhile, by the arrangement of the plurality of camera modules, the surrounding environment of the vehicle can be monitored in multiple directions, thereby achieving more comprehensive protection.

The first outer shell 12 is further provided with antislip lines, making it easy for a user to hold and mount the radar monitoring dash cam 1A.

In Embodiment II, the two second camera modules 22 are respectively arranged at the two ends of the first outer shell 12 in the horizontal direction H of the first outer shell 12, so that in Embodiment II, the specific position of the second circuit board 43 with the radar module 41 is below the first circuit board 31 in the vertical direction V. Of course, in other embodiments, the specific position of the second circuit board 43 may be above the first circuit board 31 in the vertical direction V. The present disclosure does not make a specific limitation, as long as the second circuit board is within the first accommodating chamber 12a.

Embodiment III

Figure 10:
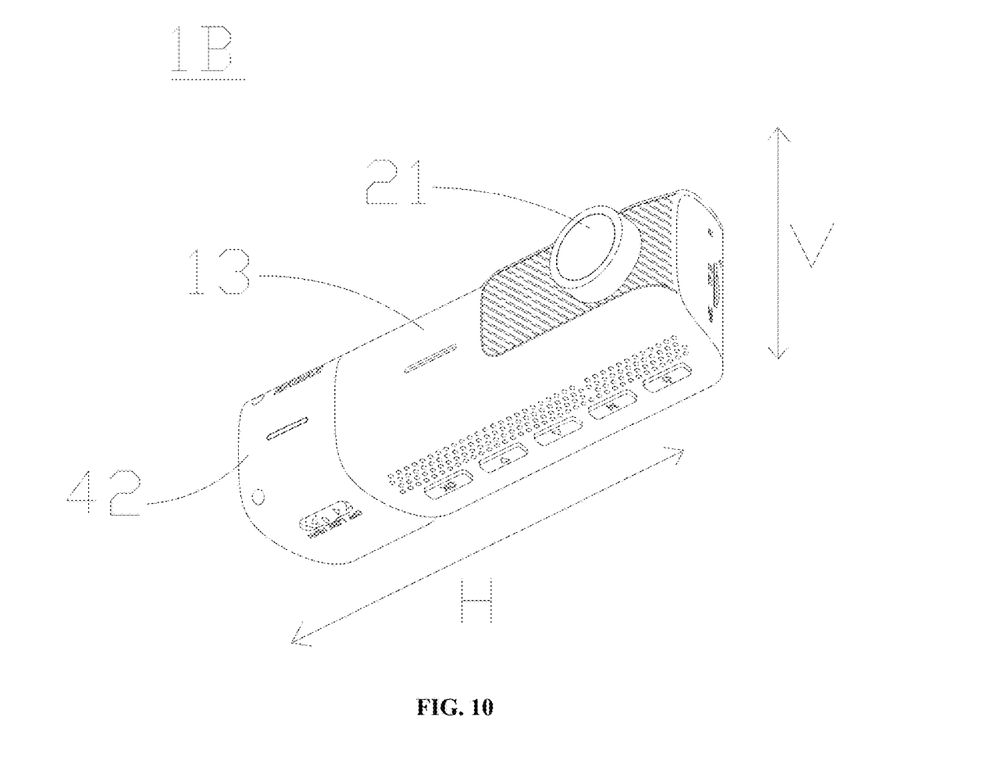
FIG. 10 is a three-dimensional diagram of a radar monitoring dash cam according to Embodiment III of the present disclosure.
Figure 11:
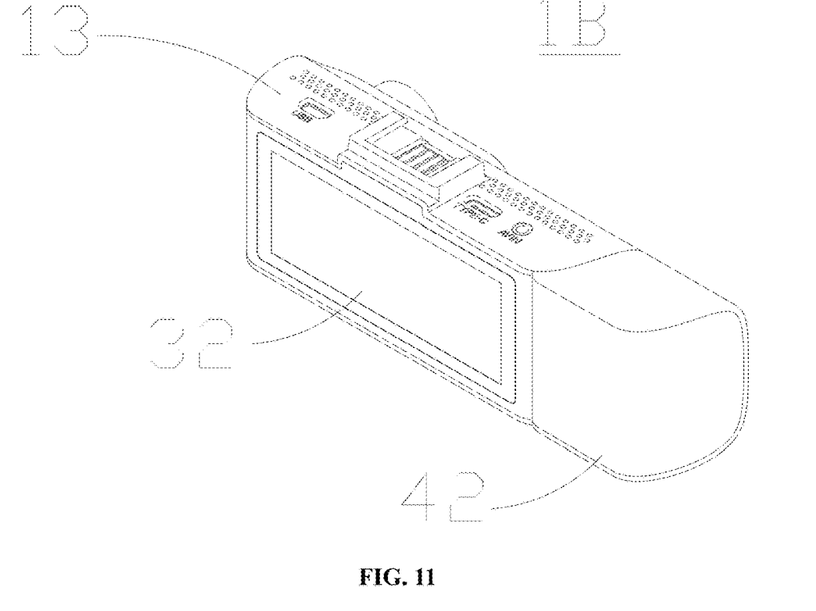
FIG. 11 is a three-dimensional diagram of a radar monitoring dash cam according to Embodiment III of the present disclosure in another angle.

Referring to FIG. 10 and FIG. 11, Embodiment III of the present disclosure provides still another radar monitoring dash cam 1B. Some structures of the radar monitoring dash cam 1B are the same as those of the radar monitoring dash cam 1 or 1A provided in Embodiment I and Embodiment II. The same structures will not be elaborated in Embodiment III. The following only describes technical solutions that are different from those in the previous two embodiments. Meanwhile, the same structural components in the three embodiments will be labeled with the same numerals, and different or distinct structural components will be labeled with different numerals.

In Embodiment III, the setting mode of the radar assembly is different from those of Embodiment I and Embodiment II. The radar assembly is an independent product structure. When the radar assembly needs to be used, the radar assembly is electrically connected to the first circuit board 36. When the radar assembly is not used, the radar assembly can be removed from the first circuit board 36 and only an image capture function of the dash cam is used. In this way, when one of the dash cam or the radar assembly is damaged, the radar assembly or the corresponding dash cam can be purchased separately. The radar assembly or the dash cam are convenient to remove and mount, and it is convenient for use and operation by a user.

Figure 12:
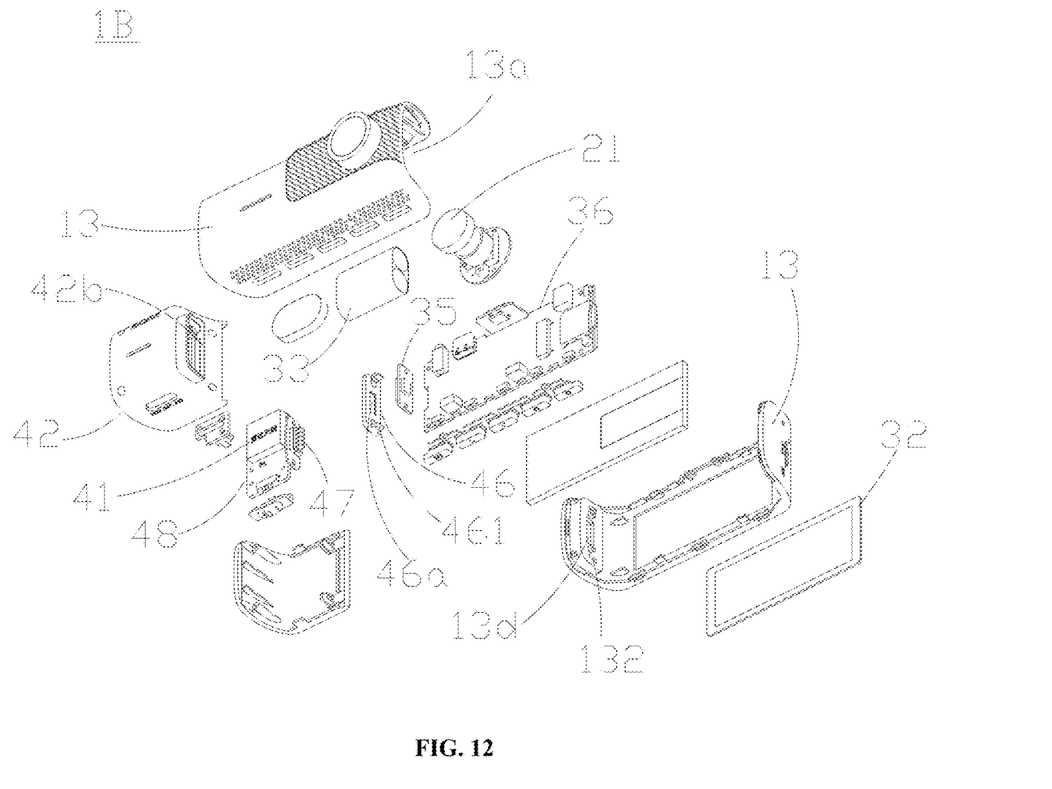
FIG. 12 is an exploded diagram of a radar monitoring dash cam according to Embodiment III of the present disclosure.
Figure 13:
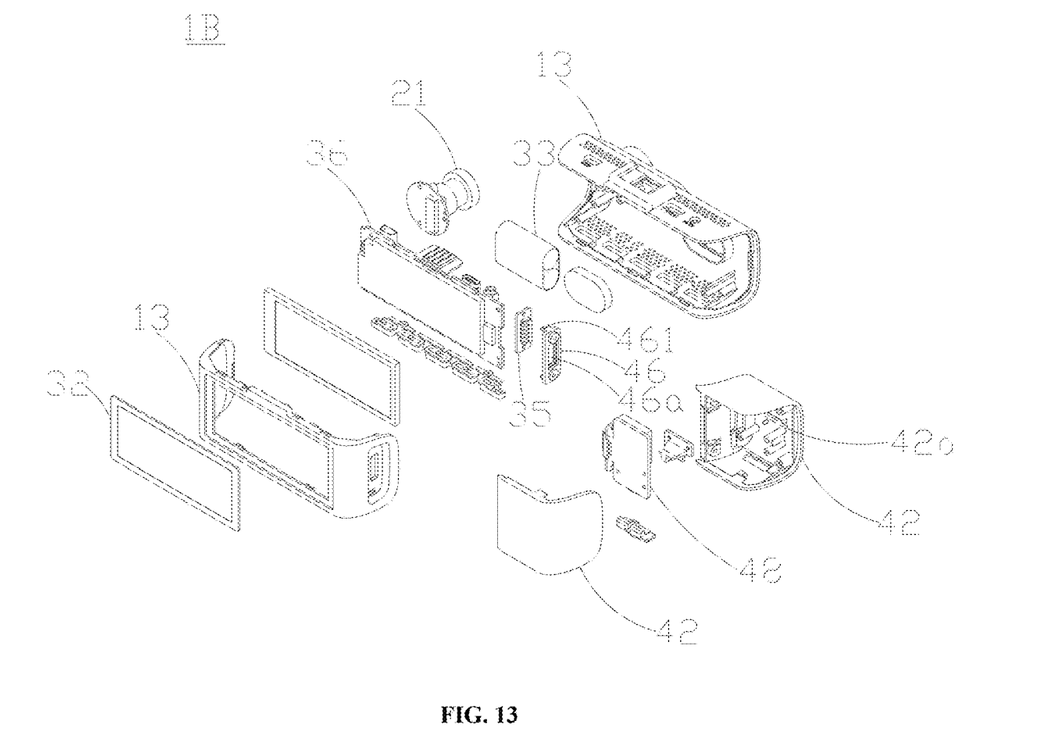
FIG. 13 is an exploded diagram of a radar monitoring dash cam according to Embodiment III of the present disclosure in another angle.

Referring to FIG. 12 and FIG. 13, the radar assembly is configured to be detachably connected to the shell assembly; and the radar module 41 is configured to be detachably electrically connected to the first circuit board 36.

Specifically, the radar assembly further includes a second outer shell 42 with a third accommodating chamber 42a, and a second circuit board 48 arranged in the third accommodating chamber 42a; and the radar module 41 is arranged in the second circuit board 48. The first outer shell 13 is provided with a third opening 13d that is communicated with the first accommodating chamber 13a, and the second outer shell 42 is provided with a connecting hole 42b that is communicated with the third accommodating chamber 42a. The first circuit board 36 is provided with a first electrical connecting piece 35; the second circuit board 48 is provided with a second electrical connecting piece 47; the second electrical connecting piece 47 is electrically connected to the first electrical connecting piece 35 through the connecting hole 42b and the third opening 13d; and the first electrical connecting piece 35 and the second electrical connecting piece 47 are configured as detachable electrical connection structures. Specifically, the first electrical connecting piece 35 is electrically connected to the first circuit board 36 and is arranged in the first accommodating chamber 13a. The first electrical connecting piece 35 directly faces the third opening 13d in the horizontal direction H. The second electrical connecting piece 47 is electrically connected to the second circuit board 48, and directly faces the connecting hole 42b in the horizontal direction H. This arrangement only needs to ensure that the second outer shell 42 and the first outer shell 13 are aligned in the horizontal direction H, and the second electrical connecting piece 47 directly faces and is inserted into the third opening 13d to be connected to the first electrical connecting piece 35. When a power supply is turned on, the second electrical connecting piece 47 and the first electrical connecting piece 35 can achieve the electrical connection between the first circuit board 36 and the second circuit board 48.

In this embodiment, the first electrical connecting piece 35 and the second electrical connecting piece 47 are connectors that can be electrically connected to each other. For example, one of the first electrical connecting piece and the second electrical connecting piece is a male socket, and the other one is a female socket, so as to achieve plug-in connection between them. Specifically, in this embodiment, the first electrical connecting piece 35 is a female socket, namely, a female part of a connector, which has a groove or a jack for receiving the male socket. The second electrical connecting piece 47 is a male part of the connector, which has a protruding contact point or a plug for being plugged into the female socket. When the second electrical connecting piece 47 is plugged into the first electrical connecting piece 35, the electrical connection between the first circuit board 36 and the second circuit board 48 can be achieved. This design can not only achieve stable connection, but also facilitates plugging and unplugging.

To prolong the service lives of both the first electrical connecting piece 35 and the second electrical connecting piece 47, the radar assembly further includes a fixed frame 46; the fixed frame 46 is arranged in the connecting hole 42b and is connected to the second outer shell 42; the fixed frame 46 is provided with a through hole 46a; and the first electrical connecting piece 35 is electrically connected to the second electrical connecting piece 47 through the through hole 46a. By the arrangement of the fixed frame 46, the second electrical connecting piece 47 can be protected. Meanwhile, the first electrical connecting piece 35 is arranged in the first accommodating chamber 13a and is also protected by the first outer shell 13. When the second electrical connecting piece 47 is fixed by the fixed frame 46, to mount and remove the radar assembly, a user only needs to pinch the second outer shell 42 with the fingers, align it with the first electrical connecting piece 35, and then plug it.

To ensure the stability of connection between the second outer shell 42 and the first outer shell 13, and facilitate the removal of the two outer shells, in Embodiment III, the fixed frame 46 is provided with a first buckle 461; the first outer shell 13 is provided with a second buckle 132; and the first buckle 461 is buckled with the second buckle 132. Specifically, the first buckle 461 is provided with a clamping block, and the second buckle 132 is a via hole provided on the first outer shell 13. When the second electrical connecting piece 47 is plugged into the first electrical connecting piece 35, the first buckle 461 and the second buckle 132 are clamped with each other.

To protect the first electrical connecting piece 35 and the second electrical connecting piece 47, a length of the protruding contact point or plug of the second electrical connecting piece 47 is equivalent to a depth of the groove or jack of the first electrical connecting piece 35, so that the maximum travel is just achieved if the first electrical connecting piece and the second electrical connecting piece are plugged. Further, a travel distance of the clamping block on the first buckle 461 in the via hole is equivalent to the length of the protruding contact point or plug of the second electrical connecting piece 47. Therefore, when the first buckle 461 is plugged into the second buckle 132, the protruding contact point or plug of the second electrical connecting piece 47 is just completely plugged into the groove or jack of the first electrical connecting piece 35. Of course, in other embodiments, the first buckle 461 and the second buckle 132 may also be a clamping protrusion and a clamping slot which are matched with each other.

Continuing to refer to FIG. 12 and FIG. 13, in Embodiment III, the control assembly further includes a battery 33. The battery 33 is arranged in the first accommodating chamber 13a and is electrically connected to the first circuit board 36. By the arrangement of the battery 33, after a vehicle engines off, the vehicle can be powered by the battery 33, thereby reducing the use of the power of a storage battery of the vehicle, and prolonging the service life of the storage battery of the vehicle.

In Embodiment III, the radar assembly is arranged in the horizontal direction H of the first outer shell 13, specifically on a right side of the first outer shell 13 in the horizontal direction H.

The first outer shell 13 is further provided with antislip lines, making it easy for a user to hold and mount the radar monitoring dash cam 1B.

Figure 14:
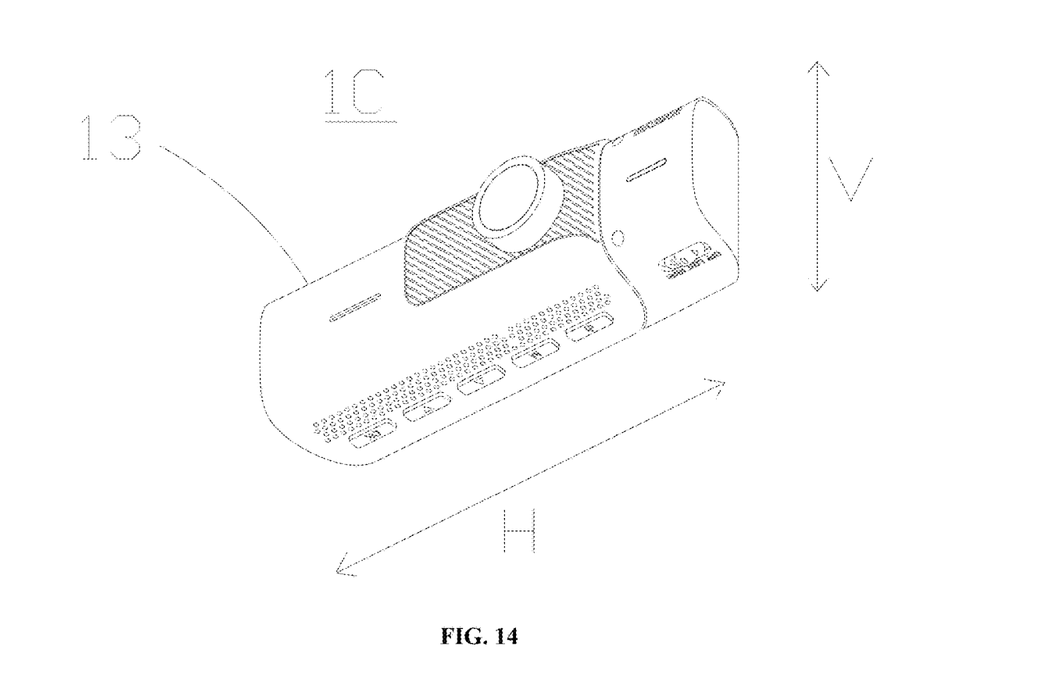
FIG. 14 is a three-dimensional diagram of a radar monitoring dash cam according to Embodiment IV of the present disclosure.

The present disclosure further provides a fourth embodiment, as shown in FIG. 14, showing a three-dimensional diagram of a radar monitoring dash cam 1C provided in Embodiment IV of the present disclosure. In this embodiment, the radar assembly is arranged in the horizontal direction H of the first outer shell 13. Specifically, when viewed from the front side of the display screen 32, the radar assembly is arranged on a left side of the first outer shell 13 in the horizontal direction H. In this embodiment, the specific structure of the radar monitoring dash cam 1C is found in the radar monitoring dash cam 1B in Embodiment III, which uses the same structure and connection mode, but only the specific position of the radar assembly is changed.

Figure 15:
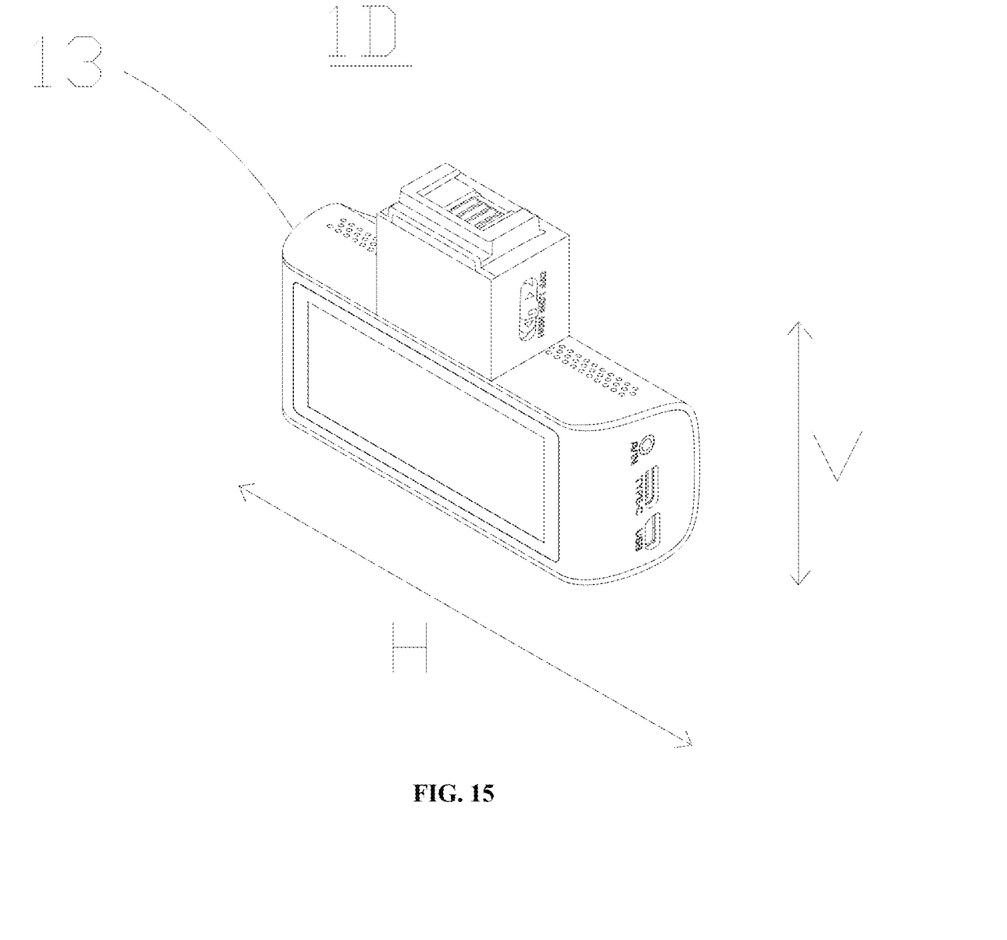
FIG. 15 is a three-dimensional diagram of a radar monitoring dash cam according to Embodiment V of the present disclosure.

The present disclosure further provides a fifth embodiment, as shown in FIG. 15, showing a three-dimensional diagram of a radar monitoring dash cam 1D provided in Embodiment V of the present disclosure. In this embodiment, the radar assembly is arranged in the vertical direction H of the first outer shell 13. Specifically, when viewed from the front side of the display screen 32, the radar assembly is arranged above the first outer shell 13 in the vertical direction V. In this embodiment, the specific structure of the radar monitoring dash cam 1D is found in the radar monitoring dash cam 1B in Embodiment III, which uses the same structure and connection mode, but only the specific position of the radar assembly is changed.

The various technical features in the foregoing embodiments may be randomly combined. For concise description, not all possible combinations of the various technical features in the above embodiments are described. However, provided that combinations of these technical features do not conflict with each other, the combinations of the various technical features are considered as falling within the scope of this specification. The foregoing embodiments merely express several implementations of the present disclosure. The descriptions thereof are relatively specific and detailed, but are not understood as limitations on the scope of the present disclosure. A person of ordinary skill in the art can also make several transformations and improvements without departing from the idea of this application. These transformations and improvements fall within the protection scope of this application. Therefore, the protection scope of the patent of this application shall be subject to the appended claims.

What is claimed is:

1. A radar monitoring dash cam, comprising:
  a shell assembly, comprising a first outer shell with a first accommodating chamber;
  a camera assembly, comprising a first camera module, wherein the first camera module is arranged in the first outer shell;
  a control assembly, comprising a first circuit board arranged in the first accommodating chamber, and the first circuit board is electrically connected to the first camera module; and
  a radar assembly, comprising a radar module, wherein the radar module is electrically connected to the first circuit board; and the camera assembly is configured to be turned on when the radar module detects that a moving object or a person approaches a preset distance;
  wherein the camera assembly further comprises at least one second camera module; the at least one second camera module is electrically connected to the first circuit board; and the at least one second camera module is configured to be rotatably connected to the first outer shell;
  wherein the first outer shell is provided with a first opening; the camera assembly further comprises a supporting frame; the supporting frame is provided with a first rotating shaft; the first rotating shaft is arranged in the first opening in a penetrating manner; the at least one second camera module is connected to the supporting frame; and the supporting frame is configured to drive the at least one second camera module to rotate around the first rotating shaft;
  wherein the supporting frame further comprises a supporting frame body and a first limiting member; the first limiting member and the supporting frame body are respectively arranged at two ends of the first rotating shaft; when the first rotating shaft is arranged in the first opening in the penetrating manner, the first limiting member is located in the first accommodating chamber; and a diameter of the first limiting member is greater than a diameter of the first opening.

2. The radar monitoring dash cam according to claim 1, wherein the radar module is arranged in the first accommodating chamber.

3. The radar monitoring dash cam according to claim 1, wherein the radar assembly comprises a second circuit board; the radar module is arranged on the second circuit board; and the second circuit board is arranged in the first accommodating chamber and is electrically connected to the first circuit board.

4. The radar monitoring dash cam according to claim 1, wherein the supporting frame further comprises a first silica gel ring; and the first silica gel ring sleeves the first rotating shaft and resists against a hole wall of the first opening.

5. The radar monitoring dash cam according to claim 1, wherein the at least one second camera module comprises a shell and a camera arranged on the shell; the shell is provided with a second rotating shaft; the supporting frame is provided with a second opening; the second rotating shaft is arranged in the second opening in a penetrating manner; and the shell is configured to drive the camera to rotate around the second rotating shaft.

6. The radar monitoring dash cam according to claim 5, wherein the at least one second camera module further comprises a second limiting member; the second limiting member and the shell are respectively arranged at two ends of the second rotating shaft; the supporting frame body comprises a side plate; the second opening penetrates through the side plate; when the second rotating shaft is arranged in the second opening in the penetrating manner, the second limiting member is located on one side of the side plate away from the shell; and a diameter of the second limiting member is greater than a diameter of the second opening.

7. The radar monitoring dash cam according to claim 6, wherein the at least one second camera module further comprises a second silica gel ring; and the second silica gel ring sleeves the second rotating shaft and resists against a hole wall of the second opening.

8. The radar monitoring dash cam according to claim 5, wherein the shell is provided with a second accommodating chamber and a mounting port communicated to the second accommodating chamber; the camera arranged in the mounting port in a penetrating manner; the at least one second camera module further comprises a third circuit board arranged in the second accommodating chamber; and the third circuit board is electrically connected to the camera and the first circuit board.

9. The radar monitoring dash cam according to claim 1, wherein the camera assembly further comprises a partition plate; the partition plate is arranged between the first outer shell and the supporting frame; the partition plate is connected to the supporting frame; a via hole is provided on the partition plate; and the first rotating shaft passes through the via hole and the first opening.

10. The radar monitoring dash cam according to claim 1, wherein the at least one second camera module comprises two second camera modules; the two second camera modules are respectively arranged at two ends of the first outer shell; and the two second camera modules are configured to be rotatably connected to the first outer shell.

11. The radar monitoring dash cam according to claim 1, wherein the radar module is configured to be detachably electrically connected to the first circuit board.

12. The radar monitoring dash cam according to claim 11, wherein the radar assembly further comprises a second outer shell with a third accommodating chamber, and a second circuit board arranged in the third accommodating chamber; the radar module is arranged on the second circuit board; the first circuit board is provided with a first electrical connecting piece; the second circuit board is provided with a second electrical connecting piece; the second electrical connecting piece is electrically connected to the first electrical connecting piece; and the first electrical connecting piece and the second electrical connecting piece are configured as detachable electrical connection structures.

13. The radar monitoring dash cam according to claim 12, wherein the radar assembly further comprises a fixed frame; the fixed frame is connected to the second outer shell; the fixed frame is provided with a first buckle; the first outer shell is provided with a second buckle; and the first buckle is buckled with the first buckle.

14. The radar monitoring dash cam according to claim 1, wherein the radar assembly is configured to be detachably connected to the shell assembly.

15. The radar monitoring dash cam according to claim 1, wherein the radar assembly further comprises a control switch configured to control the radar module; the control switch is electrically connected to the first circuit board; and the control switch is arranged in the first outer shell.

16. The radar monitoring dash cam according to claim 1, wherein the radar assembly further comprises an indicator lamp; the indicator lamp is electrically connected to the first circuit board; and the indicator lamp is configured to be turned on when the radar module works; and the indicator lamp is arranged on the first outer shell.

17. The radar monitoring dash cam according to claim 1, wherein the control assembly further comprises a display screen; the display screen is arranged on the first outer shell; and the display screen is electrically connected to the first circuit board.

* * * * *